United States Patent [19]

Hodan et al.

[11] Patent Number: 5,651,928
[45] Date of Patent: Jul. 29, 1997

[54] PROCESS FOR MELT MIXING AND SPINNING SYNTHETIC POLYMER

[75] Inventors: John A. Hodan; Matthew B. Hoyt, both of Arden; Otto M. Ilg, Asheville, all of N.C.

[73] Assignee: BASF Corporation, Mount Olive, N.J.

[21] Appl. No.: 624,211

[22] Filed: Mar. 29, 1996

Related U.S. Application Data

[62] Division of Ser. No. 613,581, Mar. 12, 1996, which is a continuation of Ser. No. 230,957, Apr. 21, 1994, abandoned.

[51] Int. Cl.$^6$ ................... D01D 4/06; D01F 8/04
[52] U.S. Cl. ................... 264/172.11; 264/172.17; 264/172.18
[58] Field of Search ................... 264/40.7, 103, 264/172.11, 172.17, 172.18, 176.1

[56] References Cited

U.S. PATENT DOCUMENTS

| | | |
|---|---|---|
| 3,049,297 | 8/1962 | O'Shaughnessy . |
| 3,200,440 | 8/1965 | Bryan et al. . |
| 3,209,402 | 10/1965 | Riley et al. . |
| 3,371,139 | 2/1968 | Frazer ................... 264/172.17 |
| 3,496,261 | 2/1970 | Parr . |
| 4,017,249 | 4/1977 | Lenk . |
| 4,019,844 | 4/1977 | Ogasawara et al. . |
| 5,244,614 | 9/1993 | Hagen . |

*Primary Examiner*—Leo B. Tentoni
*Attorney, Agent, or Firm*—Nixon & Vanderhye P.C.

[57] ABSTRACT

Synthetic polymers are melt-mixed and spun from a mixture of respective first and second polymer melt flows. Specifically, the mixture of first and second polymer melt flows are mixed at a fluidic mixing device having a mixing intersection which receives the first and second polymer melt flows and discharges the mixture thereof respectively into at least one or another of multiple discharge ports fluid-connected with a respective spinning nozzle. The mixed flow of first and second polymer melt flows is controlled by diverting the first polymer melt so that it (i) entirely flows along a first flow path to responsively merge with the second polymer melt flow at the mixing intersection of the mixing device and thereby cause the mixed polymer flow to be discharged through the one discharge port, or (ii) entirely flow along a second flow path to responsively merge with the second polymer melt at the mixing intersection of the mixing device and thereby cause the mixed polymer flow to be discharged through the other discharge port. The mixed polymer flow thereby diverted is thus spun by one or another of the spinning nozzles, respectively.

3 Claims, 4 Drawing Sheets

5,651,928

PROCESS FOR MELT MIXING AND SPINNING SYNTHETIC POLYMER

This is a divisional of application Ser. No. 08/613,581, filed Mar. 12, 1996, which in turn is a continuation of application Ser. No. 08/230,957 filed Apr. 21, 1994 (now abandoned).

FIELD OF THE INVENTION

The present invention relates to an apparatus for melt mixing and spinning synthetic polymer for the manufacture of yarns with a plurality of bundles of filaments, whereby the properties of all filaments in all bundles alternate along their length and the properties of the filaments of each bundle of adjacent bundles alternate between the adjacent bundles.

BACKGROUND OF THE INVENTION

An apparatus for melt mixing and spinning synthetic polymers into filaments from a plurality of spinning nozzle units connected to a melt extruder through a metering pump is described in U.S. Pat. No. 4,017,249. If the characteristics of the fibers should change along their length, the synthetic polymer or additives have to be changed in the extruder. This changes the characteristics of all spun filaments along their length at once. Attempts have been made to change the properties alternately in the direction of the fiber axis. U.S. Pat. No. 4,019,844 discloses an apparatus for producing multiple layers conjugate fibers which have a housing with a rotary cylinder plug and a stationary spinning plate with a plurality of spinning orifices that are positioned and lined up with the passageways of the rotary cylinder plug. This apparatus creates a multiple layer conjugate fibers with parabolic interface. Disadvantage of this apparatus is the use of the rotary cylinder plug which is technically difficult to operate.

Object of the present invention was to provide an apparatus for melt mixing and spinning synthetic polymers for the manufacture of yarns with a plurality of bundles of filaments, whereby the properties of all filaments in all bundles alternate along their length and the properties of the filaments of each bundle of adjacent bundles alternate between the adjacent bundles.

Another object of the present invention was an apparatus for the manufacture of colored yarns with a plurality of bundles of filaments, whereby the colors of all filaments in all bundles alternate along their length and the colors of the filaments of each bundle of adjacent bundles alternate between the adjacent bundles.

SUMMARY OF THE INVENTION

The objects of the present invention were achieved with an apparatus for melt mixing and spinning synthetic polymers, which comprises:

a) a plurality of spinning nozzle units;

b) a main extruder with a capacity sufficient to feed a polymer melt to said plurality of spinning nozzle units;

c) a main metering pump for receiving the polymer melt through a conduit system from said main extruder and diverting the polymer melt through a branched conduit system comprising a first branch and a second branch to said spinning nozzle unit;

d) a plurality of multiple way valves;

e) a two way valve for receiving said polymer melt from said main metering pump and for directing said polymers melt through said first branch or through said second branch and through said multiple way valves to said plurality of spinning nozzle units, thereby directing the way within said multiple way valves;

f) means for directing a plurality of concentrates through said multiple way valves to said spinning nozzle units; each of said multiple way valves thereby combining said polymer melt received from said first branch with one of said concentrates to a polymer melt mixture and directing said polymer melt mixture to one of said plurality of spinning nozzles units or combining said polymer melt received from said second branch with one of said concentrates to a polymer melt mixture and directing said polymer mixture to another one of said plurality of spinning nozzle units.

DESCRIPTION OF THE PREFERRED EMBODIMENTS

Figure 1:
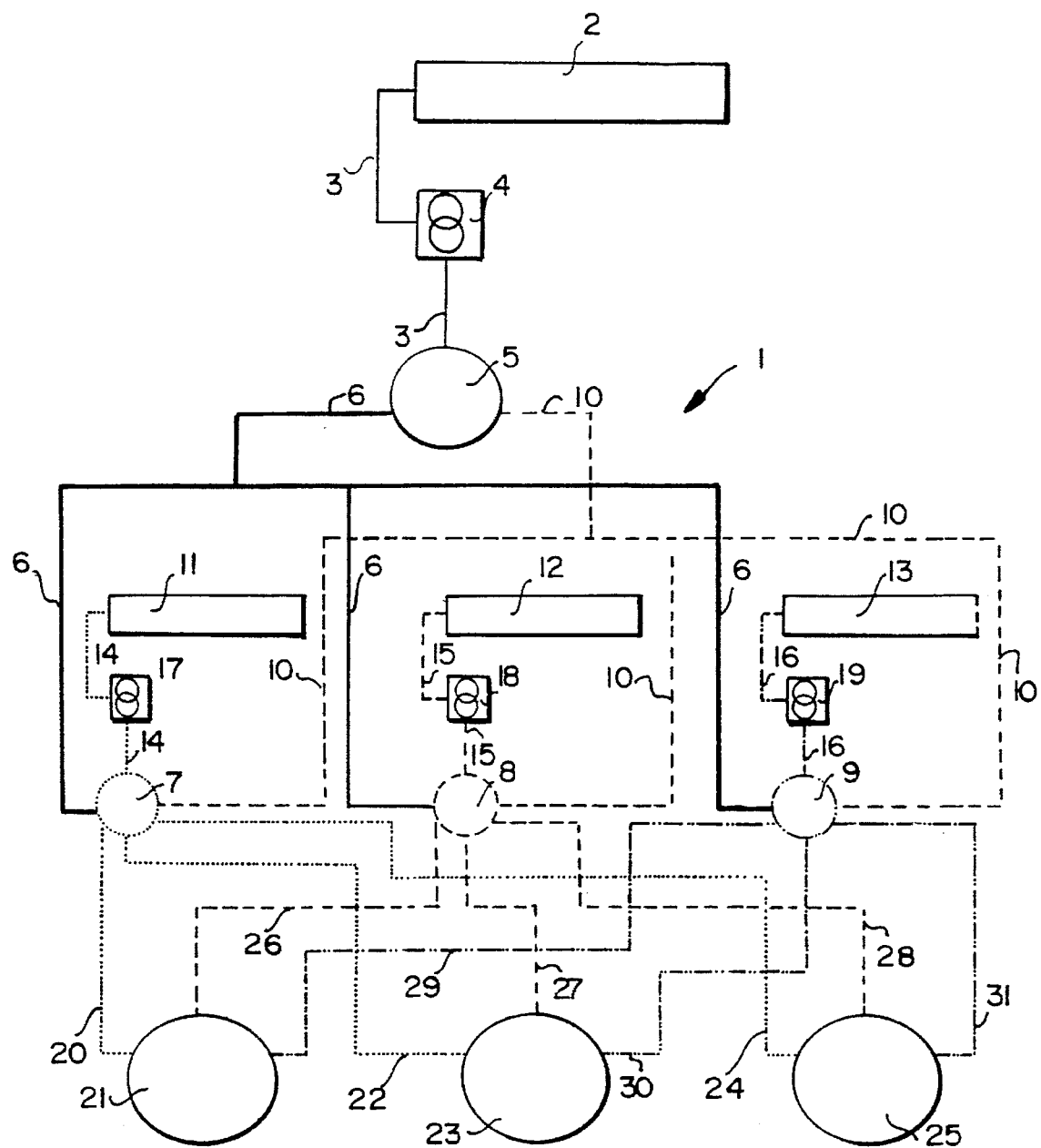
FIG. 1 is a schematic view of an apparatus for melt mixing and spinning synthetic polymers.

FIG. 1 shows an apparatus for melt mixing and spinning synthetic polymers (1) for the manufacture of synthetic polymer yarns whose properties change along their length and between adjacent filaments. The synthetic polymer is molten in the main extruder (2) and directed through a conduit system comprising pipes (3) by the main metering pump (4) to the two way control valve (5). The polymer melt is either conveyed through a first branch of a branched conduit system comprising pipes (6) or over a second branch of a branched consuit system comprising pipes (10) or over both pipes (6) and pipes (10) to the first three way fluidic device (7), the second three way fluidic device (8) and the third three way fluidic device (9). Concentrates are formed in the first concentrate extruder (11), the second concentrate extruder (12) and the third concentrate extruder (13) and directed over pipes (14) by the first concentrate pump (17) to the first three way fluidic device (7), over pipes (15) by the second concentrate pump (18) to the second three way fluidic device (8) and over pipes (16) by the third concentrate pump (19) to the third three way fluidic device (9).

The first three way fluidic device (7) is connected over the pipe (20) with the first spinning nozzle unit (21), over the pipe (22) with the second spinning nozzle unit (23) and over the pipe (24) with the third spinning nozzle unit (25). The second three way fluidic device (8) is connected over the pipe (26) with the first spinning nozzle unit (21), over the pipe (27) with the second spinning nozzle unit (23) and over pipe (28) with the third spinning nozzle unit (25). The third three way fluidic device (9) is connected over pipe (29) with the first spinning nozzle unit (21), over the pipe (30) with the second spinning nozzle unit (23) and over the pipe (31) to the third spinning nozzle unit (25).

Figure 2A:
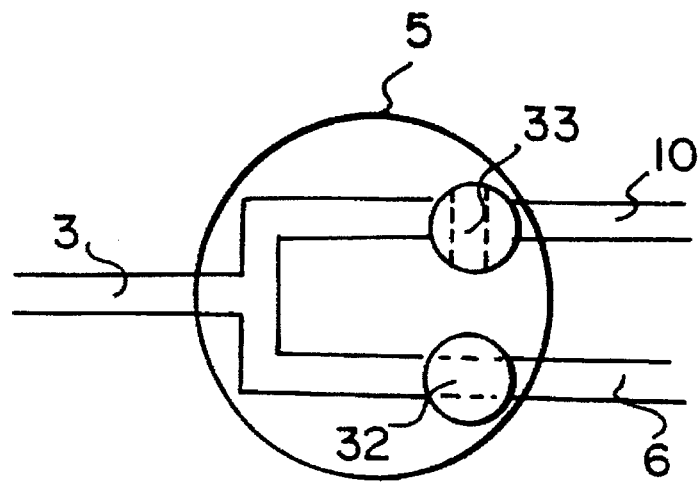
FIGS. 2A and B are schematic views of a two way control valve.

FIG. 2A shows a two way control valve (5) with pipes (3), (6) and (10) and valve members (32) and (33). In the indicated position, valve member (33) is closed and valve member (32) is open, allowing the polymer flow coming from pipe (3) to go into pipe (6).

Figure 2B:
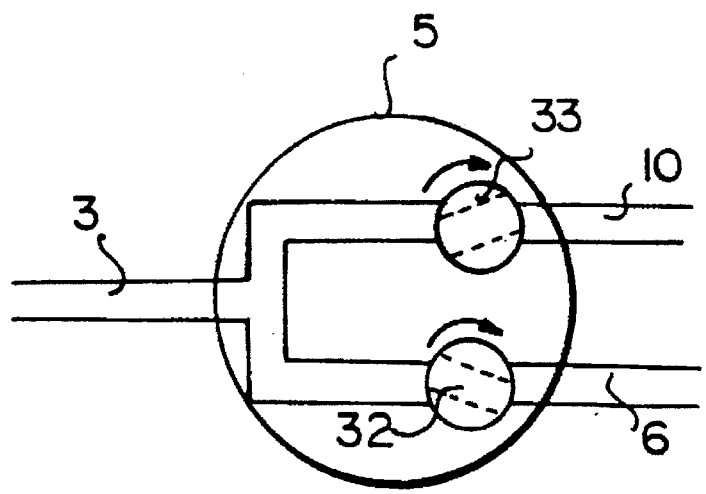

FIG. 2B shows the same two way control valve (5) like FIG. 2A in another where valve member (32) is in the half closed position and valve member (33) is in the half open position, the arrows above valve members (32) and (33) indicated the turn direction of the valve members. In this position the polymer flows from pipes (3) is directed equally into pipes (6) and (10).

Figure 3:
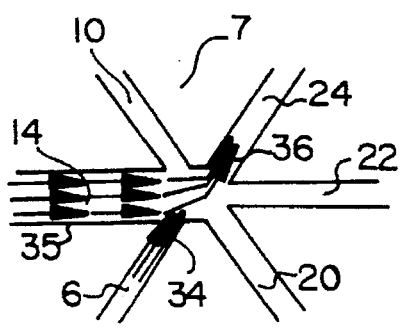
FIG. 3 is a schematic view of a three way fluidic device showing a polymer melt flow and a concentrate melt flow.

FIG. 3 shows the three way fluidic device (7) with incoming pipes (6), (10), (14), and exiting pipes (20), (22) and (24). The arrows (34) indicate the flow of the polymer, the arrows (35) indicate the flow of the concentrate and the arrows (36) indicate the flow of the polymer and concentrate mixture. In the indicated position, the polymer melt flow is directed through pipe (6), the concentrate flow is directed through pipe (14) and meets the polymer flow at the intersection of pipe (6) and pipe (14) where both flows are mixed and directed to pipe (24).

Figure 4:
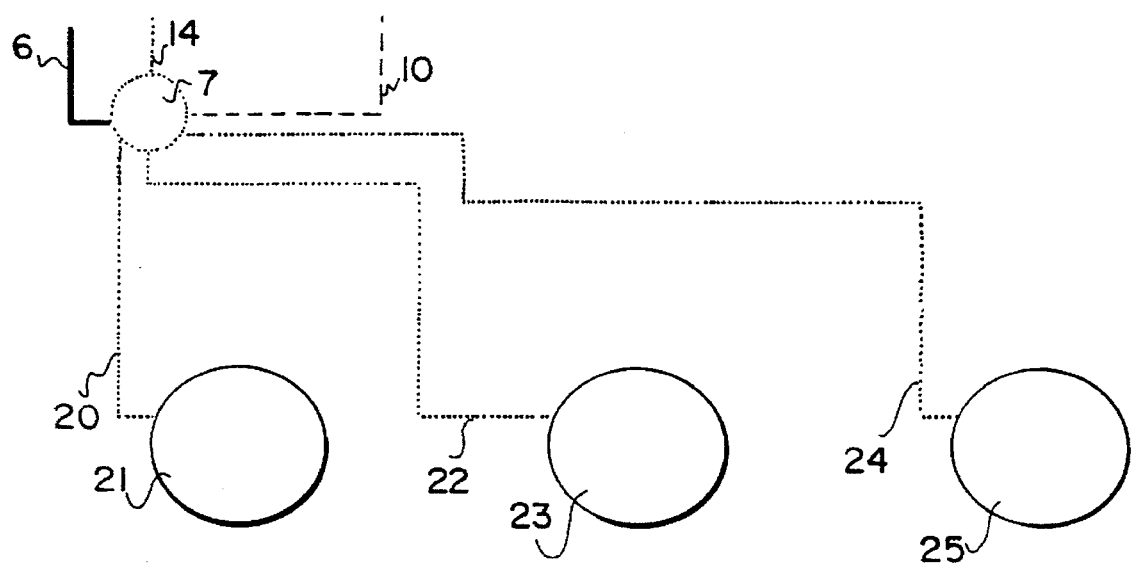
FIG. 4 is a schematic view of a detail of FIG. 1, which is a three way fluidic device with distribution lines to three spinning nozzle units.

FIG. 4 shows for the purpose of clarity a detail of FIG. 1, the first three way fluidic device (7) with the incoming pipes (6), (10) and (14) and the exiting pipes (20), (22) and (24) which are connected with the spinning nozzle units (21), (23) and (25).

Figure 5:
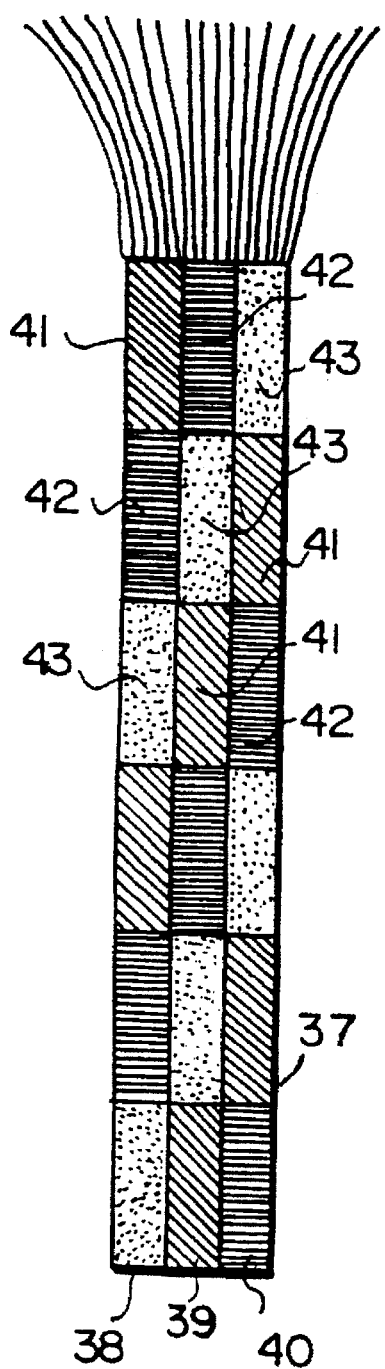
FIG. 5 is a side view of a yarn with three bundles of filaments.

FIG. 5 shows the product of the apparatus of the present invention, a yarn (37) with three bundles of filaments (38), (39) and (40), whereby the properties of all filaments in all three bundles alternate along their length (41), (42) and (43) and the properties of the filaments of each bundle of adjacent bundles (38), (39) and (40) alternate between the adjacent bundles, which means that along a cross section of the yarn (37) the properties of the fibers in bundle (38) are different from the properties of the fibers in bundle (39), which is adjacent to bundle (38) and the properties of the fibers in bundle (39) are different to the properties in bundle (40), which is adjacent to bundle (39). According to FIG. 5 one sequence of properties of filaments along a cross section of the yarn (37) is (41), (42) and (43), followed by (42), (43) and (41), followed by (43), (41) and (42).

For the manufacture of fibers all fiber forming thermoplastic materials are suitable, especially polyamides, polyesters, polyolefins, polycarbonate and polyacrylonitrile.

Suitable polyamides are nylon 6, nylon 6/6, nylon 6/9, nylon 6/10, nylon 6/12, nylon 11, nylon 12, copolymers thereof and mixtures thereof. Preferred polyamides are nylon 6 and nylon 6/6. Suitable polyesters are polyalkylene terephthalate and polyalkylene naphthalates, preferably polyethylene terephthalate. Suitable polyolefines are polymers of $C_2$- to $C_{10}$- olefins, in particular polyethylene, polypropylene and their copolymers.

For the manufacture of the yarn, the polymer is fed into the main extruder (2) in form of chips or granules, or as molten resin, melted and directed through pipe (3), which is jacketed and heated by the jacketed DOWTHERM® heating fluid (Dow Chemical, Midland Mich.) to the main metering pump (4).

The temperature of the melt at the exit of the extruder is from about 180° C. to about 350° C., according to the respective polymer.

The metering pump (4) controls the amount and the speed of the polymer melt flow and directs it to the two way valve (5). The two way valve (5) directs the polymer melt flow through branches of a conduit system with pipes (6) and (10) to the three way fluidic devices (7) (8) and (9) in three different ways:

1. From pipe (3) into pipe (6), whereby valve member (32) is open and valve member (33) is closed according to FIG. 2A.

2. From pipe (3) into pipe (10), whereby valve member (33) is open and valve member (32) is closed.

3. From pipe (3) into pipes (6) and (10), whereby valve member (32) is in a half closed or half open position and valve member (33) is in a half closed or half open position according to FIG. 2B.

The apparatus of the present invention contains a plurality of multiple way fluidic devices, preferably from 2 to 10, most preferred from 2 to 3. Each of the multiple way fluidic devices is connected to a concentrate extruder and to a plurality of spinning nozzle units. The number of fluidic devices, concentrate extruders and spinning nozzle units is preferably the same, so that if an apparatus of the present invention has two, two way fluidic devices, it also has two concentrate extruders and two spinning nozzle units. An apparatus with three, three way fluidic devices has preferably three concentrate extruders and three spinning nozzle units. As an example, the operation of the three way fluidic device is described with reference to FIGS. 1, 3 and 4.

The concentrate extruder (11) forms or melts polymer concentrates based on polymers equal to or different from the polymer used in the main extruder.

Additives like dyes, pigments, lubricants, nucleating agents, antioxidants, ultraviolet light stabilizers, antistatic agents, soil resistant, stain resistant, antimicrobial agents, flame retardants and the like are added to the polymer and melt mixed to a homogenous polymer mixture in the concentrate extruder. The concentration of the additives are chosen according to the desired properties of the final filaments and yarns.

The different concentrate extruders are run with different concentrates in order to achieve the object of the apparatus of the present invention.

The concentrate melt is directed through the concentrate metering pump (17) over pipe (14) to the three way fluidic device (7).

As indicated above, the operation of the three way fluidic device (7) depends on the position of the two way valve (5). Three different ways are possible:

Way 1: If the two way valve (5) is in the position indicated in FIG. 2A, the polymer melt from main extruder (2) is directed through pipe (6) and merges with the concentrate in the intersection of pipe (6) and (14) in the three way fluidic device (7). The polymer melt flow directs the concentrate flow into pipe (24) and to the spinning nozzle unit (25).

Way 2: If valve member (33) of the two way valve (5) is open and valve member (32) is closed, the polymer melt is directed from pipe (3) into pipe (10) and directs the concentrate flow into pipe (20) and to the spinning nozzle unit (21).

Way 3: If valve member (32) of the two way valve (5) is half open or half closed and valve member (33) is half open or half closed, the polymer melt is divided and directed through pipes (6) and (10). Both polymer melt flows direct the concentrate flow into pipe (22) and to the spinning nozzle unit (23).

The three, three way fluidic devices (7), (8) and (9) are connected with the spinning nozzle units (21), (23) and (25) in such a way, that in all three ways of the position of the two way valve (5) all spinning nozzle units are simultaneously served, whereby, always one spinning nozzle unit is exclusively served from one of the three three way fluidic devices (7), (8) or (9). For the three different ways described above the simultaneous serving of the three spinning nozzle units (21), (23) and (25) is as follows:

Way 1: Spinning nozzle unit (25) is served by three way fluidic device (7), spinning nozzle unit (23) is served by fluidic device (8) and spinning nozzle unit (21) is served by fluidic device (9).

Way 2: Spinning nozzle unit (21) is served by fluidic device (7), spinning nozzle unit (23) is served by fluidic device (9) and spinning nozzle unit (25) is served by fluidic device (8).

Way 3: Spinning nozzle unit (23) is served by fluidic device (7), spinning nozzle unit (21) is served by fluidic device (8) and spinning nozzle unit (25) is served by fluidic device (9).

The polymer melt is spun from the spinning nozzles into a yarn.

The result is a yarn, which contains three bundles of filaments, whereby the properties of all filaments in all bundles alternate along their length and the properties of the filaments of each bundle of adjacent bundles alternate between the adjacent bundles according to FIG. 5.

The length of the filament with unchanged properties is determined by the speed of the valves (32) and (33) of the two way valve are switched and by the spinning speed. Their length is from about 0.1 to about 2.0 m, preferably from about 0.25 to about 1.0 m and depends on the application of the yarn.

A few examples for applications are alternating yarn color for space dyed effect; alternating yarn luster; changing crimp/texture capacity of yarn along its length; yarns which have changing adhesive properties along its length; yarns whose elongation varies along its length; and yarns whose denier varies along its length.

We claim:

1. A method for melt mixing and spinning synthetic polymer comprising the steps of:

forming first and second polymer melt flows;

mixing said first and second polymer melt flows at a fluidic mixing device having a mixing intersection which receives said first and second polymer melt flows and discharges a mixed flow of said first and second polymer melts respectively at least into one or another of multiple discharge ports fluid-connected with a respective spinning nozzle; and controlling the discharge of said mixed flow of said first and second polymer melt flows by controllably diverting said first polymer melt so that it (i) entirely flows along a first flow path to responsively merge with said second polymer melt flow at said mixing intersection of said fluidic mixing device and thereby cause said mixed polymer flow to be discharged through said one of said discharge ports, or (ii) entirely flows along a second flow path to responsively merge with said second polymer melt at said mixing intersection of said fluidic mixing device and thereby cause said mixed polymer flow to be discharged through said another of said discharge ports; and spinning said mixed polymer flow through spinning nozzles respectively fluid-connected with said one and another of said discharge ports.

2. A method for melt mixing and spinning synthetic polymer comprising the steps of:

forming first and second polymer melt flows;

mixing said first and second polymer melt flows at a fluidic mixing device having a mixing intersection which receives said first and second polymer melt flows and discharges a mixed flow of said first and second polymer melts respectively at least into one or another of multiple discharge ports fluid-connected with a respective spinning nozzle; and controlling the discharge of said mixed flow of said first and second polymer melt flows by controllably diverting said first polymer melt so that it (i) entirely flows along a first flow path to responsively merge with said second polymer melt flow at said mixing intersection of said fluidic mixing device and thereby cause said mixed polymer flow to be discharged through said one of said discharge ports, or (ii) entirely flows along a second flow path to responsively merge with said second polymer melt at said mixing intersection of said fluidic mixing device and thereby cause said mixed polymer flow to be discharged through said another of said discharge ports; and spinning said mixed polymer flow through spinning nozzles respectively fluid-connected with said one and another of said discharge ports, wherein said first polymer melt flow is directed to each of a plurality of fluidic mixing devices, and wherein a plurality of said second polymer melt flows is formed and directed to a respective one of said fluidic mixing devices.

3. A method for melt mixing and spinning synthetic polymer comprising the steps of:

forming first and second polymer melt flows;

mixing said first and second polymer melt flows at a fluidic mixing device having a mixing intersection which receives said first and second polymer melt flows and discharges a mixed flow of said first and second polymer melts respectively at least into one or another of multiple discharge ports fluid-connected with a respective spinning nozzle; and controlling the discharge of said mixed flow of said first and second polymer melt flows by controllably diverting said first polymer melt so that it (i) entirely flows along a first flow path to responsively merge with said second polymer melt flow at said mixing intersection of said fluidic mixing device and thereby cause said mixed polymer flow to be discharged through said one of said discharge ports, or (ii) entirety flows along a second flow path to responsively merge with said second polymer melt at said mixing intersection of said fluidic mixing device and thereby cause said mixed polymer flow to be discharged through said another of said discharge ports; and spinning said mixed polymer flow through spinning nozzles respectively fluid-connected with said one and another of said discharge ports, wherein said first polymer melt is controllably diverted along each of said first and second flow paths so as to merge with said second polymer melt flow at said mixing intersection of said fluidic device to thereby cause said mixed flow of said first and second polymer melt flows to be discharged through a third one of said discharge ports.

* * * * *